United States Patent Office 2,732,027
Patented Jan. 24, 1956

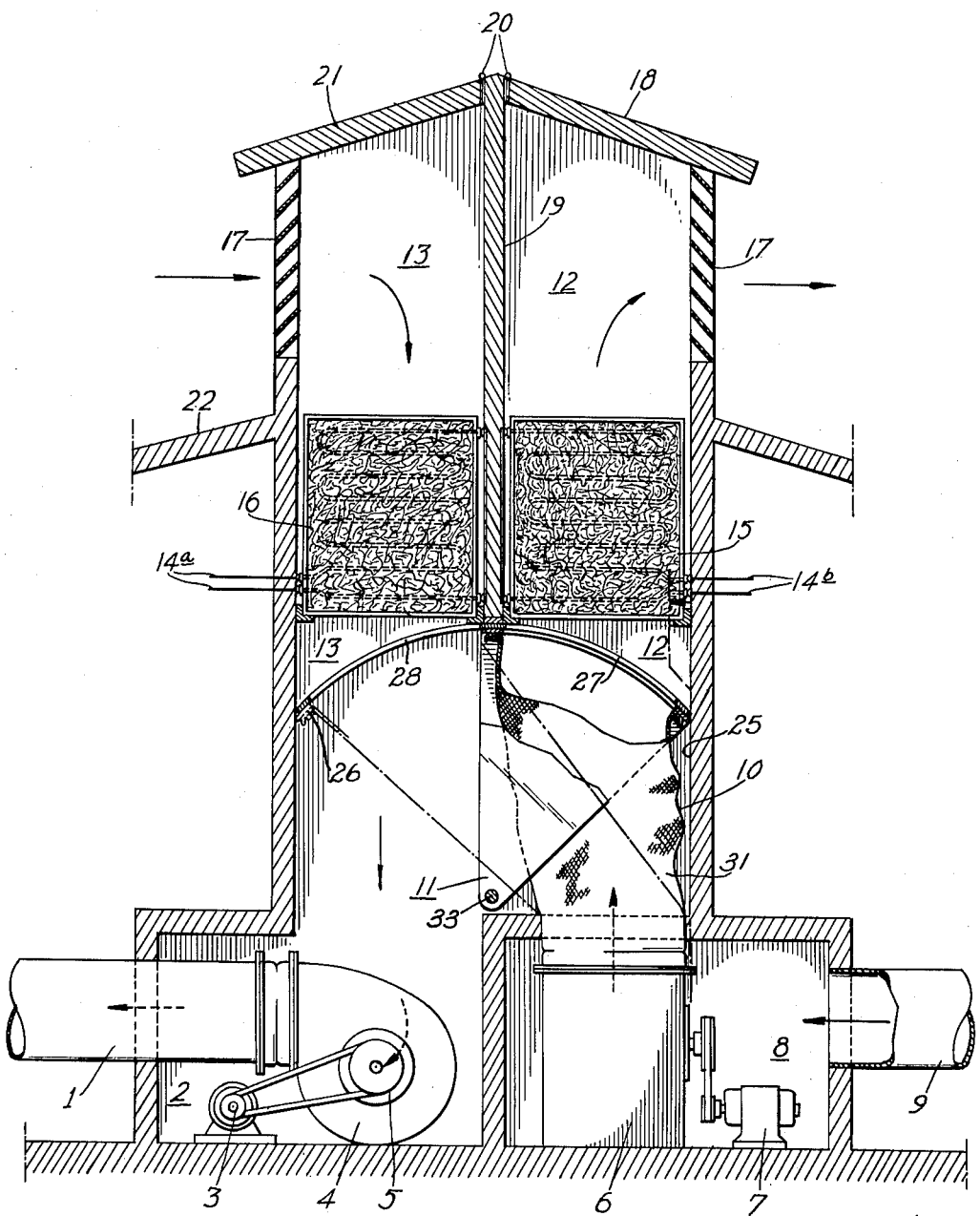

2,732,027
VENTILATING APPARATUS WITH HEAT EXCHANGE MEANS

Sven Werner Wallin, Jonkoping, Sweden, assignor to Aktiebolaget Svenska Flaktfabriken, Stockholm, Sweden Application December 7, 1951, Serial No. 260,526

Claims priority, application Sweden December 13, 1950

3 Claims. (Cl. 183—4.1)

The present invention relates to ventilating apparatus having means for heat exchange comprising main conduits for supplying fresh air to and exhausting used air from one or more compartments connected with the main conduits by means of branch conduits, each of the main conduits being connected to one of two separate adjacent chambers having an inlet and exhaust fan respectively.

The invention is especially characterized by a shaft divided by a partition into two channels, each communicating with the atmosphere at one end and each enclosing a bed of heat and moisture accumulating composition. The shaft is arranged in close relation to the chambers and a valve means is connected at one end to one of the chambers and is movable so that its other end may be positioned alternately in register with the adjacent end of each of the channels to thereby connect one chamber alternately with the channels. The channel with which the valve means is out of register is in open communication with the other chamber. In the particular embodiment of the invention herein disclosed the valve means is operable to direct exhaust air alternately into each channel for heat exchange with the heat and moisture accumulating composition. Upon adjustment of the valve means so that the exhaust chamber communicates with the other channel intake air is drawn through the first channel and is warmed by heat exchange with the heat and moisture accumulating composition. In accordance with the invention, automatic means (not shown) may be provided for reversing the valve means and for varying the duration of the intervals between the reversing of the valve means.

The intervals at first will be of short duration and then the reversals will be less frequent to provide longer intervals. According to another feature of the invention, heating elements are embedded in the heat and moisture accumulating composition in each channel for defrosting or drying purposes. The energization of these elements may be controlled periodically by any suitable means which desirably takes the form of a mechanical device or electrical circuit (not shown) which also operates the means for reversing the valve means.

Thus, in cold climates where the incoming air has a tendency to freeze the moisture contained in the heat and moisture-accumulating composition, the heating elements are energized when the composition is passing atmospheric air. The heat eliminates any frost accumulating on the composition which would spoil the efficiency of the composition and increase the resistance to the passage of air therethrough. Thus, the heating units serve primarily to maintain the composition free from frost and the like.

The invention yields a considerably improved heat economy for ventilating plants so that it will be economical to install mechanical ventilation for compartments where this has earlier been used only for hygienic or technical reasons. Silica gel is preferably used as a heat and moisture-adsorbing composition, but other materials such, for example, as brick chips may be used. By using silica gel, an increase of temperature is obtained by the adsorption of moisture from the exhausted used air which provides improved heat exchange between the two air currents by means of the composition in the channels. Since the plant is intended to operate without drainage, the moisture retained in the composition must be vaporized and expelled. For a fully effective utilization of the composition, the time interval for exhausting the used air through each shaft channel is varied. Condensation will thereby occur in different layers of the composition. The heating elements may be made of rather weak wires having a minimum of mass and without proper composition, which wires are placed in the composition as serpentines and their energization is controlled by a device common to that of the reversing apparatus of the connecting valve. The heating elements are intended to be connected only during air intake periods if necessary for defrosting purposes or at predetermined time intervals.

The invention will now be more fully described in connection with the attached drawing wherein the figure is a vertical sectional view of a ventilating plant made in accordance with the present invention.

In the drawing, supply and exhaust conduits 1 and 9 respectively lead to the compartment which is to be ventilated by the illustrated ventilating plant provided with means for heat exchange. Valve means may be provided in each of the conduits which may constitute the central members of an integral duct system for ventilating a complete building, if desired. The conduits 1 and 9 terminate in fan chambers 2 and 8 respectively which are provided with fan units 4 and 6. In the present embodiment the fan units are driven by individual motors 3 and 7 respectively, but it is within the scope of the invention to employ a common driving device for the fans. The two fan chambers open into a common shaft 25 extending upwardly from the chambers and opening to the atmosphere at its upper end by means of louvers 17 in the roof structure of the plant. The shaft is divided into two channels 12 and 13 by a longitudinal partition 19. A valve means 10 is connected to one of the fan chambers, in the present instance, the chamber 8, and is operable to put this chamber selectively into communication with one of the shaft channels 12 and 13. The valve means 10 may be reversed to connect the chamber 8 with the other of the channels by means indicated generally at 11. Sealing means is provided at 26 between the valve means 10 and the inlets 27 and 28 respectively to the channels 12 and 13.

It will be seen that when the valve means is in the full line position of the figure, the channel 12 will constitute an exhaust channel and the channel 13 will constitute an intake channel for the ventilating plant. When the valve means is shifted to the broken line position of the figure, the air flow through the channels 12 and 13 will be reversed, the channel 13 serving as an exhaust channel and the channel 12 serving as an intake channel.

The reversing apparatus 11 for the valve means may be of any known design. For example, any suitable means may be provided for rocking the shaft 33 between the clockwise limit position shown in full lines, and the counterclockwise limit position shown in broken lines. Preferably, this mechanism includes means for varying the intervals between the alternate positioning of the connecting valve means 10, first providing rapid reversing of the tubular valve element 10, and then a slow reversing of the element.

In accordance with the invention, heat and possibly moisture accumulating compositions 15 and 16 are placed in the shaft channels 12 and 13 respectively. Heating elements for defrosting or drying purposes can be provided in the compositions and extend as serpentines therein and be provided with connectors 14a and 14b as clearly illustrated in the figure. The compositions 15 and 16 may be removed, and contact devices are provided in the partition and the sides of the shaft for connecting the heating elements when the compositions are secured in place. The shaft 25 extends above the roof 22 of the building as a tower, and the tower is provided with hoods 18 and 21 hinged to the partition 19 as indicated at 20 which permit the exchange or replacement of the compositions 15 and 16.

In the operation of the device, the air is drawn into the channel 13 by the fan 4. As the air passes through the composition 16, it becomes more or less hot and moist depending on the relative heat and moisture content of the outside air and the composition 16. The air is circulated through the compartments and is exhausted into the channel 12 by the fan 6 and the valve means 10. The exhausted air gives up the moisture and heat to the composition 15, and is expelled into the atmosphere. After a predetermined period between, for example, five seconds and five minutes, the valve means 10 is reversed and the air is drawn through the composition 15 and expelled through composition 16 to utilize the heat and moisture accumulated in the composition 15 from the previously exhausted air. In this manner there is regenerative heat exchange.

While a particular embodiment of the invention has been illustrated and described herein, changes and modifications may be made therein and thereto within the scope of the following claims.

I claim:

1. For a ventilating plant employing a continuous supply of atmospheric air and exhausting continuously waste air, a regenerative heat exchanger for transferring heat from said waste air to said atmospheric air, a first fan chamber, a fan in said chamber for supplying atmospheric air to said ventilating system, a second fan chamber, a fan in said second chamber for discharging exhaust air from said ventilating system, a shaft in open communication at one end with one of said fan chambers, partition means in said shaft dividing the other end thereof into two parallel channels, openings in said channels affording open communication thereof with the atmosphere, a bed of heat accumulating composition in each channel intermediate said openings and said one fan chamber, and a flexible tubular element connected at one end to the other of said fan chambers and movable at the other end between a first position in fluid communication with one of said parallel channels, and a second position in fluid communication with the other of said parallel channels, said tubular element in its first position effecting flow of air through said other fan chamber and said one channel in one direction, and affording flow of air through said other channel and said one fan chamber in the opposite direction, and in the second position affording flow of air through the one channel and said one fan chamber in the said opposite direction, and effecting flow of air through said other fan chamber and said other channel in said one direction.

2. A device according to claim 1 including means for periodically reversing said tubular element and means for automatically varying the period of the reversing.

3. Apparatus according to claim 1 including heating elements embedded in said heat accumulating composition, and means for energizing the heating element in each channel when said channel is passing atmospheric air.

References Cited in the file of this patent

UNITED STATES PATENTS

| | | |
|---|---|---|
| 1,206,977 | Batter | Dec. 5, 1916 |
| 1,924,849 | Fonda | Aug. 29, 1937 |
| 2,204,431 | Moore et al. | June 11, 1940 |
| 2,248,225 | Fonda | July 8, 1941 |
| 2,257,478 | Newton | Sept. 30, 1941 |
| 2,501,280 | Kemp et al. | Mar. 21, 1950 |
| 2,606,627 | Asker | Aug. 12, 1952 |